W. E. FOLEY.

METHOD AND APPARATUS FOR ELECTRICALLY HEATING METAL.

APPLICATION FILED JULY 1, 1915.

1,217,431. Patented Feb. 27, 1917.

Inventor
William E. Foley.
By H. O. Richey
His Attorney

W. E. FOLEY.

METHOD AND APPARATUS FOR ELECTRICALLY HEATING METAL.

APPLICATION FILED JULY 1, 1915.

1,217,431. Patented Feb. 27, 1917.

Inventor
William E. Foley.
By F.O. Richey
His Attorney

UNITED STATES PATENT OFFICE.

WILLIAM E. FOLEY, OF CLEVELAND, OHIO, ASSIGNOR TO THE DOLLAR SAVING AND TRUST COMPANY, OF YOUNGSTOWN, OHIO, A CORPORATION OF OHIO.

METHOD AND APPARATUS FOR ELECTRICALLY HEATING METAL.

1,217,431. Specification of Letters Patent. Patented Feb. 27, 1917.

Application filed July 1, 1915. Serial No. 37,547.

*To all whom it may concern:*

Be it known that I, WILLIAM E. FOLEY, a citizen of the United States, and a resident of Cleveland, in the county of Cuyahoga and State of Ohio, have invented certain new and useful Improvements in Methods and Apparatus for Electrically Heating Metal; and I do hereby declare the following to be a full, clear, and exact description of the invention, such as will enable others skilled in the art to which it appertains to make and use the same.

I am aware that heretofore electric current has been employed for heating metals for welding and other purposes. However, in the machines and methods heretofore used, much trouble has been experienced, owing to the burning away of the material used for one or more of the terminals employed. This causes an unequal heating of the metal and irregularity in the product, as well as requiring much attention on the part of the operator of the machine or those who are supervising the operation. These troubles, serious enough where the operations are limited to manual operations, become intolerable in connection with automatic machinery, since in addition to the heating, other operations are frequently performed simultaneously and automatically upon the metal, especially in such uses as the manufacture of tubing where it is practically impossible and absolutely unprofitable where the irregularities caused by the irregular heating must be repaired.

One of the objects of my invention is to provide apparatus and a method for electrically heating metal for welding and other purposes, wherein the heating effect on the metal produced by such apparatus, or in the employment of such method will be constant, thereby insuring a uniform tube. One of the uses of my invention is in connection with automatic tube welding machinery where other operations are performed upon the tube simultaneously with the heating operation and where to properly coöperate with the other apparatus, the heating must be uniform. I mention this as one of the uses to which my invention applies, though it will be readily appreciated that it is highly serviceable in other uses.

I also aim to produce apparatus and a method which requires less attention from an attendant than the apparatus and methods heretofore employed.

These and other objects of my invention will be better understood perhaps from a description of an embodiment of my invention.

Figure 2:
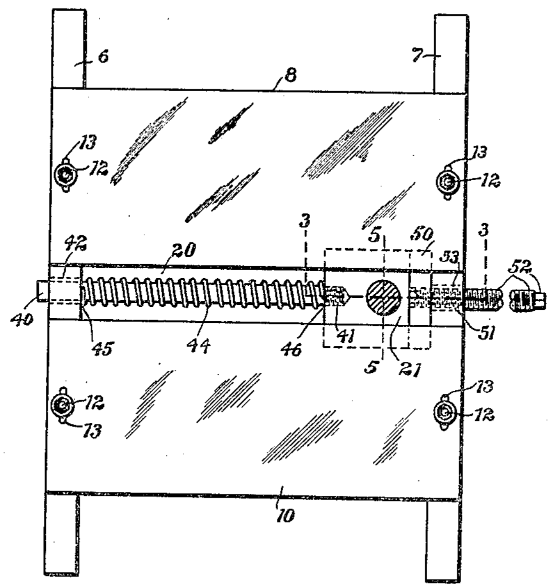
Fig. 2 is a side elevation of the apparatus shown in Fig. 1 with the disk removed.
Figure 3:
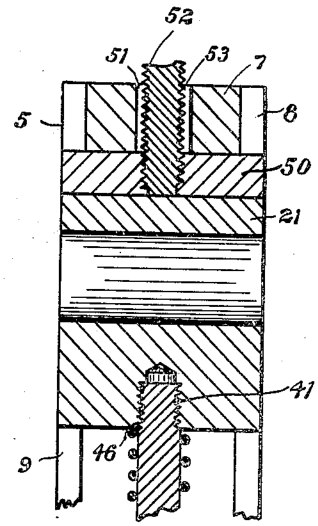
Fig. 3 is a section taken along the lines 3—3 shown in Fig. 2.

Referring now to the drawing, the frame is shown at 5 and here consists of two lateral members 6 and 7, which may be made of suitable material, such as copper and the upright members 8, 9, 10 and 11, which may also be made of suitable material, such as copper. The upright and lateral members are connected together by suitable means, such as bolts 12. I may provide slots 13 in the upright members for the purpose of allowing adjustments to be made. As arranged in the drawings, openings 20 are formed between the upright members.

I have shown at 22 a piece of metal which is to be heated. Here I have illustrated a piece of skelp turned over with its edges adjacent each other. These edges are to be welded together. A source of current, such as a generator, is shown at 23, one of whose terminals is connected by a conductor 24 to the tube, preferably through a terminal 25. The other terminal of the generator is connected by a conductor 26 to some portion of the frame 5. The frame is connected to a second terminal 30. This terminal consists of a movable member, here shown as a rotatable carbon disk mounted upon a shaft 31 journaled to rotate in a block 21. A nut 90 is threaded on the end 91 of this shaft, holding the disk 30 in place. Means are provided for rotating the shaft 31 with the disk 30, here shown as a pulley 32. This pulley may be driven by an engine, motor or other source of power. The block 21 is mounted to slide up and down in the frame. As shown, the corners of the block are cut away at 35, 36, 37 and 38 to engage the corners of the upright members, which guide the block as it is moved up and down in the frame. A rod 40 is connected to the bottom of the block, preferably by threading it into an opening 41 in the bottom of the block. The rod 40 passes through an opening 42 in the member 6, in which it slides freely. Means are provided for normally pushing the block upward, here shown as a spring 44, which abuts at one end 45 against the member 6 and at the other end 46 against the block 21.

During the operation of the device, the disk is kept constantly in rotation, maintaining a constant arc and a constant heating effect upon the metal, thereby overcoming the objections to the devices hitherto in use for these purposes, which required much adjusting, owing to the rapid burning away of the carbon. It will thus be seen that I have provided means for localizing the arc, but at the same time exposing to the arc a large surface which burns away slowly, so that adjustments must be made very much less frequently than in the older devices, for, while the flame acts upon the periphery of the disk, just as it does upon the pencil, the time during which each portion of the periphery of the disk is exposed to the flame is relatively small and the action of the flame thereon is likewise relatively small, so that it requires considerable time for the burning of the disk to increase the air gap sufficiently to require a readjustment.

Means are provided for adjusting the disk with respect to the metal, both for the purpose of initiating or renewing the arc and for securing permanent adjustments thereof. A second block is shown at 50, which is provided with a threaded perforation 51. A threaded rod 52, provided with threads to coöperate with the threads in the opening 51, passes through the opening 51 and an opening 53 in the member 7, through which latter opening 53 it passes freely. The lower end 55 of the rod 52 abuts against the top of the block 21.

When it is desired to start the arc, or to cause it to be remade, the whole system, including the rod 52, the block 50, the block 21, the shaft and the carbon disk are forced down, reducing the air gap 94, until the arc is made. These parts are then released, whereupon the spring 44 returns them to the normal adjusted position suitable for the maintenance of the arc, which has once been made. When it is desired to cause a permanent adjustment, the rod 52 is rotated, turning in the threaded opening 51 and adjusting the block 21 with respect to the block 50, the spring 44 always maintaining the system in such a position that the block 50 is forced against the bottom of the member 7. The block 50 is also cut away at its corners, as illustrated at 55, 56, 57 and 58, which engage the corners of the members 8, 9, 10 and 11, which guide the block as it is moved up and down in the frame.

Figure 1:
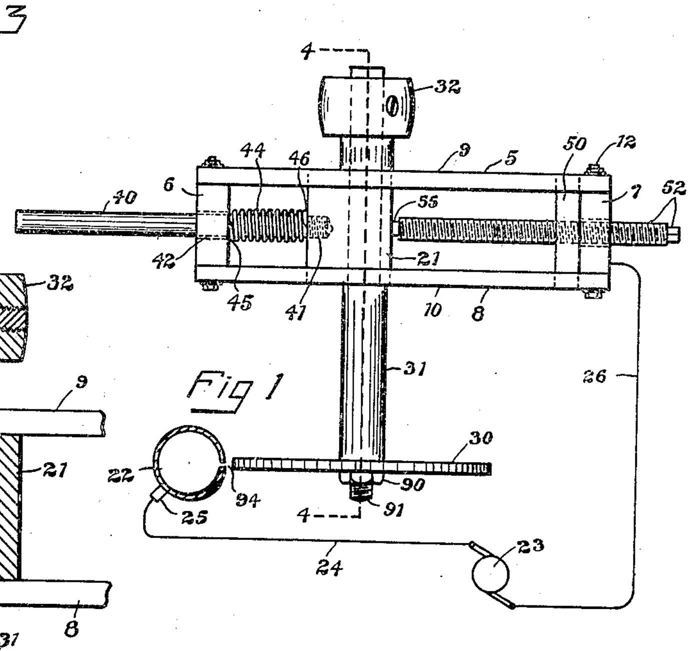
Figure 1 is an end elevation of an embodiment of my invention showing the parts 90° from their normal position.
Figure 4:
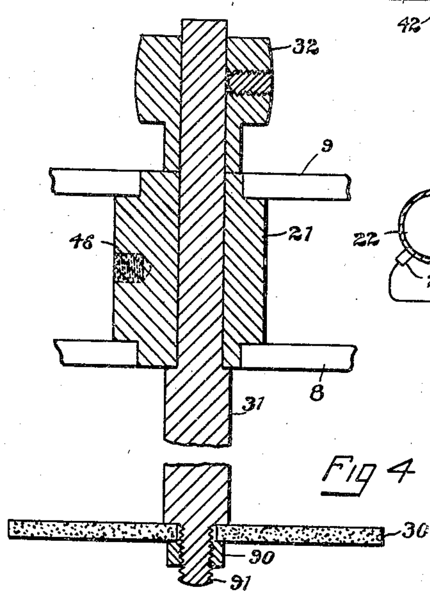
Fig. 4 is a section taken along the line 4—4 in Fig. 1.
Figure 6:
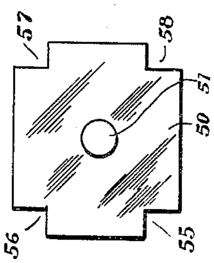
Fig. 6 is a plan view of the block 50.
Figure 5:
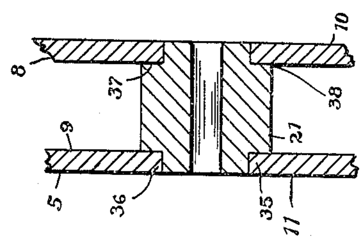
Fig. 5 is a section through 5—5 of Fig. 2.
Figure 7:
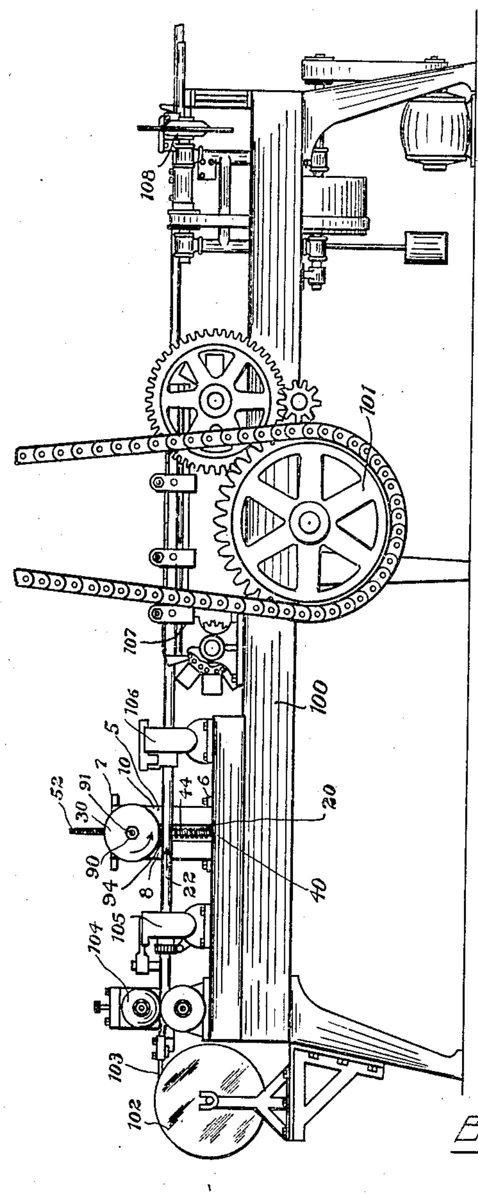
Fig. 7 is a side elevation of one form of automatic tube welding machine, showing the application of my invention thereto.

In Fig. 7 of the drawing I have shown an automatic tube making machine to illustrate one of the important uses of my invention. At 100 is shown the frame of this machine and at 101, the means through which the machine is driven. At 102 is shown a skelp reel, the skelp being shown at 103. At 104, 105 and 108 means are shown for performing various operations upon the skelp in its formation into tubing of desired section and length. For instance, at 104 means are shown for forming the tubing; at 105, means for straightening its edges; at 106, means for reducing the size of the tubing; at 108, means for cutting it off at desired lengths. At 107 I show means for drawing the tubing through the machine. The skelp having been formed into the shape shown at 22 in Fig. 1 is welded in the machine at any suitable point in the operation. All of the operations are performed as the tube moves constantly and regularly through the machine, each part operating upon the same. Under such circumstances it is necessary that the welding should be faithfully carried on simultaneously with the other operations and that the flame and the welding must be constant and regular.

Whenever the arc is to be made, or remade, it is customary and nearly always necessary to bring the terminals or poles of the arc (here shown as 22 and 30) into contact. When pencils or such poles are employed, the moving member 22 breaks or otherwise deforms the pencil; the member 30, however, being rotatable, turns as the member 22 passes thereunder without injury to the parts. To realize this advantage, I prefer to rotate the member 30, so that points upon its periphery will move in the same relative direction with adjoining points on the member 22 as shown by the arrows in Fig. 7.

I have shown this particular embodiment of my invention and its details for the purpose of illustrating the same. I do not wish to be limited to such form and details as many departures may be made therefrom without departing from the spirit of the invention.

I claim:—

1. In a device of the class described, the combination of a piece of material to be heated, a source of electric current, means to connect said source to said piece of material, a movable terminal associated with said piece of material with a gap between said terminal and said piece of material across which electric current may arc, means to connect said terminal to said source, and mechanism to keep said terminal in unidirectional motion in a plane parallel to the long axis of said piece of material while the current is arcing said gap.

2. In a device of the class described, the combination of a piece of metal to be heated, a source of electric current connected to said piece of metal, a rotatable terminal having a short axis associated with said piece of metal with a gap between said terminal and said piece of metal across which electric current may arc and means to connect said terminal to said source of current and mechanism to keep said terminal in rotation about its short axis while the current is arcing said gap.

3. In a device of the class described, the combination of a piece of metal adapted to be heated, a source of electric current, a conductor connecting said source to said piece of metal, a rotatable terminal associated with said piece of metal with a gap between said terminal and said piece of metal across which electric current may arc, means to connect said terminal to said source of current and mechanism to rotate said terminal in a plane parallel to the long axis of said piece of metal.

4. In a device of the class described, the combination of a source of electric current, a rotatable thin disk connected to said source of current, a piece of metal to be heated associated with said disk with a gap between said piece of metal and the periphery of said disk, means to connect said piece of metal to said source of current and mechanism to rotate said disk while the current is arcing said gap.

5. In a device of the class described, the combination of a piece of metal to be heated, a source of electric current, a conductor connecting said source to said piece of metal, a rotatable thin carbon disk forming an electric terminal associated with said piece of metal with a gap between the periphery of said disk and said piece of metal across which electric current may arc, means to connect said disk to said source and mechanism to keep said disk in rotation while the current is arcing said gap.

6. In a device of the class described, the combination of an electric circuit, including a source of current, said circuit being provided with a gap across which electric current is adapted to arc, terminals of said circuit on either side of said gap and means including a thin rotatable disk for continually changing the material exposed to the current at each end of said arc without disturbing the arc.

7. In a device of the class described, the combination of an electric circuit including a source of current and a pair of terminals, there being a gap between said terminals across which the current may arc and means including a thin rotatable disk for constantly changing the material exposed at both ends of said arc without disturbing said arc.

8. In a device of the class described, the combination of an electric circuit including a source of current and a pair of terminals, there being a gap between said terminals across which the current arcs and means including a thin rotatable disk for constantly and regularly changing the material exposed at both ends of said arc without disturbing the arc.

9. In a device of the class described, the combination of an electric circuit, including a source of current and a pair of terminals, one of said terminals being rotatable and the other being movable rectilineally, there being a gap between said terminals across which the current arcs and mechanism to move one of said terminals rectilineally and to rotate the other in a plane parallel to the line of motion of the first named terminal.

10. In a device of the class described, the combination of an electric circuit including a source of current and a pair of terminals separated to form a gap therebetween across which current arcs, means to rotate one of said terminals and means to move the other terminal rectilineally parallel to the plane in which the first named terminal is rotated.

11. In a device of the class described, the combination of an electric circuit including a source of current and a pair of electric terminals separated to form a gap therebetween across which the current in said circuit may arc, means to move one of said terminals rectilineally, mechanism to operate upon said terminal independently of said arc while said terminal is moving rectilineally and means to rotate the other of said terminals in a plane parallel to the line in which said first named terminal moves.

12. In a device of the class described, the combination of an electric circuit including a source of current and a pair of electric terminals separated from each other to form a gap across which current may arc, means to move one of said terminals rectilineally, mechanism to operate upon said terminal independently of said arc while it is moved rectilineally and means to move the other terminal simultaneously with the movement of the first and in the same direction thereas.

13. In a device of the class described, the combination of a rectilineally movable piece of metal to be heated, said piece of metal constituting one of the terminals of an electric circuit, a cylindrical, rotatable terminal having its sides adjacent the piece of metal and slightly separated therefrom, means to move the first named terminal rectilineally and to rotate the second named terminal, a source of current and conductors connecting said source and terminals.

14. In a device of the class described, the combination of an electric circuit including a source of current and a pair of electric terminals, one of said terminals consisting of a thin rotatable disk and the other of a piece of metal associated with the periphery of the disk to form a gap therebetween across which the current in the circuit may arc, means to rotate the rotatable terminal, means to move the other terminal rectilineally while the first terminal is rotating and mechanism to operate upon said last named terminal independently of said arc.

15. In an automatic tube welding machine, the combination of a piece of metal to be welded into a tube, means to move said piece of metal longitudinally, a source of current connected to said piece of metal, a thin disk-shaped rotatable terminal associated with the edges of the piece of metal to heat the same with a gap between said terminal and the edges of said metal across which the current from said source may arc, means for rotating said rotatable terminal, mechanism for moving said piece of metal longitudinally and mechanism for operating on said piece of metal independently of said arc while the current is arcing said gap.

16. In an automatic tube welding machine, the combination of a frame, means in said frame to move a piece of metal to be formed into a tube, a source of current connected to said piece of metal, a rotatable disk connected to said source of current and associated with the edges of said piece of metal to form a gap between such edges on the one hand and the periphery of the rotatable terminal on the other, across which the current from said source may arc, means to constantly and regularly rotate said terminal during the operation of the machine and the arcing of the current and mechanism to operate upon said piece of metal independently of said arc.

17. The method of regularly heating metal electrically, which consists in providing an electric arc, constantly and regularly moving said piece of metal through said arc and constantly and regularly moving a terminal of said arc in the same direction as the piece of metal without disturbing the flow of current across said arc.

18. In a device of the class described, the combination of a metal tube having an open seam, mechanism to move said tube rectilineally, a cylindrical terminal having an element of its side adjacent the edges of the open seam, said terminal spanning the seam and slightly separated therefrom, means to rotate said terminal, the side of the terminal being always adjacent to the edges of the seam, a source of current, conductors connecting said source and terminals and apparatus to operate on said tube independently of said current.

19. In a device of the class described, the combination of a rectilineally movable tube section with an open seam, mechanism to move said tube section rectilineally, a thin rotatable cylindrical terminal mounted with an element of its side adjacent the edges of the seam and slightly separated therefrom, means to rotate said cylindrical terminal maintaining one of the elements of its side adjacent said seam, the adjacent portions of said tube and terminal being moved by said means and mechanism in the same direction, a source of current and conductors connecting said tube section and terminal.

20. In a device of the class described, the combination of a piece of metal to be heated, a source of electric current, means to connect said source to said piece of metal, a movable terminal associated with said piece of metal with a gap between said terminal and said piece of metal across which electric current may arc, means to connect said terminal to said source, mechanism to keep said terminal in motion in a plane parallel to the long axis of said piece of metal while the current is arcing said gap and means to bring said terminals together to initiate said arc.

21. In a device of the class described, the combination of a piece of metal to be heated, a source of electric current, means to connect said source to said piece of metal, a movable terminal associated with said piece of metal with a gap between said terminal and said piece of metal across which electric current may arc, means to connect said terminal to said source, mechanism to keep said terminal in motion in a plane parallel to the long axis of said piece of metal while the current is arcing said gap, means to bring said terminals together to initiate said arc and apparatus for permanently adjusting said movable terminal with respect to the piece of metal.

22. In a device of the class described, the combination of a piece of metal to be heated, a source of electric current connected to said piece of metal, a rotatable terminal associated with said piece of metal with a gap between said terminal and said piece of metal, across which electric current may arc, means to connect said terminal to said source of current, mechanism to keep said terminal in rotation in a plane parallel to the long axis of said piece of metal while the current is arcing said gap, means to move said rotatable terminal toward said piece of metal to reduce said gap to initiate the arc and apparatus for permanently adjusting the rotatable terminal.

23. In a device of the class described, the combination of a piece of metal to be heated, a source of electric current connected to said piece of metal, a rotatable terminal, consisting of a carbon disk, associated with said piece of metal with a gap between said terminal and said piece of metal, across which electric current may arc, means to connect said terminal to said source of current, mechanism to keep said terminal in rotation in a plane parallel to the long axis of said piece of metal while the current is arcing said gap, means to move said rotatable terminal toward said piece of metal to reduce said gap to initiate the arc and apparatus for permanently adjusting the rotatable terminal.

24. In a device of the class described, the combination of a pair of electric terminals, a source of current and conductors connecting said source to said terminals; said terminals being normally separated to form a gap which may be bridged by the electric arc, one of said terminals being rotatable, a shaft upon which said rotatable terminal is mounted, a supporting block in which said shaft is journaled to rotate, a frame, guiding ways in said frame in which the supporting block is movable, a second block movable in said frame, means to move said blocks in said frame together and means to adjust one of said blocks with respect to the other.

25. In a device of the class described, the combination of a pair of electric terminals, a source of current and means to connect said source to said terminals, said terminals being normally separated to form a gap across which the electric arc may bridge, one of said terminals consisting of a rotatable carbon disk, a rotatable shaft to which said disk is connected, a movable supporting block to which said shaft is journaled to rotate, means by which said shaft is rotated, a frame, guiding ways in said frame along which the block is movable and means to move said block in said ways to bring said terminals together to start the arc.

26. In a device of the class described, the combination of a pair of electric terminals, a source of current and means to connect said source to said terminals, said terminals being normally separated to form a gap across which the electric current from said source may arc, one of said terminals consisting of a rotatable carbon disk, a rotatable shaft to which said disk is connected, a movable supporting block in which said shaft is journaled to rotate, means by which the shaft is rotated, a frame in which said supporting block is movable, a second block movable in said frame and means to adjust said blocks with respect to each other, said disk, shaft and blocks being movable bodily to reduce the gap between the terminals to initiate the electric arc.

27. In a device of the class described, the combination of a pair of electric terminals, a source of current and means to connect the source to the terminals, said terminals being normally separated to form a gap across which the current from said source may arc, one of said terminals consisting of a rotatable carbon disk whose periphery is associated with the other terminal, a rotatable shaft upon which said disk is mounted, a movable supporting block in which said shaft is journaled to rotate, means by which the shaft is rotated, a frame in which said supporting block is movable, a spring normally tending to push said block in one direction to increase the distance between the terminals, means for adjusting said block to regulate the distance between the terminals and means for moving said parts against said spring to reduce said gap to initiate the arc.

28. In a device of the class described, the combination of a pair of electric terminals, a source of current and means to connect said source to said terminals, said terminals being normally separated to form a gap between the terminals over which current from the source may arc, one of said terminals consisting of a thin disk-shaped rotatable member whose edge is associated with the other terminal and means for keeping said rotatable member in rotation to constantly present to said arc new sections of its periphery.

29. In a device of the class described, the combination of an electric arc terminal, movable supporting means for said terminal, a frame in which said terminal and supporting means are movable, a block in said frame provided with a threaded opening, a threaded shaft passing through said opening and abutting against said supporting means for adjusting said supporting means with respect to said block, said frame being provided with a perforation through which said shaft projects, said parts being movable together in said frame.

30. In a device of the class described, the combination of a source of current and a circuit including two movable terminals separated by a gap across which current from said source may arc, means to move one of said terminals rectilineally and means to simultaneously rotate the other of said terminals so that points upon its periphery adjacent the other terminals are moving in the same direction as the other terminal.

31. In a device of the class described, the combination of an electric terminal consisting of two parts of metal in juxtaposition to each other to be heated or welded, a source of electric current, means to connect said source to said disk-shaped terminal, a relatively thin movable terminal associated with said first named terminal with a gap between the terminals across which electric current from said source may arc, means to connect said second terminal to said source and mechanism to keep the second terminal in motion while the current is arcing said gap.

32. In a device of the class described, the combination of an electric terminal consisting of two parts of metal in juxtaposition to each other to be heated or welded, a source of electric current connected to said disk-shaped terminal, a second and relatively thin rotatable terminal associated with said first terminal with a gap between said terminals across which electric current may arc, said second terminal being connected to said source of current and mechanism to keep said terminal in rotation while the current is arcing said gap.

33. In a device of the class described, the combination of an electric terminal consisting of two parts of metal in juxtaposition to each other adapted to be heated or welded, a source of electric current connected to said disk-shaped terminal, a second and relatively thin rotatable terminal associated with the first terminal with a gap between said terminals across which current from said source may arc, said second terminal connected to said source of current, means to keep said first terminal in motion during the heating or welding operation and mechanism to keep said second terminal in rotation while the current is arcing the gap.

I have hereunto signed my name this 21st day of June, 1915.

WILLIAM E. FOLEY.

Corrections in Letters Patent No. 1,217,431.

It is hereby certified that in Letters Patent No. 1,217,431, granted February 27, 1917, upon the application of William E. Foley, of Cleveland, Ohio, for an improvement in "Methods and Apparatus for Electrically Heating Metal," errors appear in the printed specification requiring correction as follows: Page 3, line 88, claim 9, before the period insert the words *without disturbing the arc;* page 5, line 124, claim 31, page 6, line 8, claim 32, and same page, line 21, claim 33, strike out the compound word "disk-shaped"; page 5, line 125, claim 31, page 6, line 9, claim 32, and same page, line 22, claim 33, before the word "terminal" insert the compound word *disk-shaped;* and that the said Letters Patent should be read with these correction therein that the same may conform to the record of the case in the Patent Office.

Signed and sealed this 3d day of April, A. D., 1917.

[SEAL.]

F. W. H. CLAY,
*Acting Commissioner of Patents.*

Cl. 219—8.